(12) United States Patent
Lv et al.

(10) Patent No.: US 11,893,804 B2
(45) Date of Patent: Feb. 6, 2024

(54) METHOD AND DEVICE FOR PROTECTING CHILD INSIDE VEHICLE, COMPUTER DEVICE, COMPUTER-READABLE STORAGE MEDIUM, AND VEHICLE

(71) Applicant: NIO TECHNOLOGY (ANHUI) CO., LTD, Hefei (CN)

(72) Inventors: Chao Lv, Hefei (CN); Shiting Wang, Hefei (CN); Lin Mu, Hefei (CN); Yejia Qi, Hefei (CN)

(73) Assignee: NIO TECHNOLOGY (ANHUI) CO., LTD, Hefei (CN)

( * ) Notice: Subject to any disclaimer, the term of this patent is extended or adjusted under 35 U.S.C. 154(b) by 50 days.

(21) Appl. No.: 17/570,947

(22) Filed: Jan. 7, 2022

(65) Prior Publication Data
US 2022/0222949 A1   Jul. 14, 2022

(30) Foreign Application Priority Data

Jan. 8, 2021 (CN) .......................... 202110024705.7

(51) Int. Cl.
*G06V 20/59* (2022.01)
*G06V 40/16* (2022.01)
(Continued)

(52) U.S. Cl.
CPC ......... *G06V 20/59* (2022.01); *B60H 1/00742* (2013.01); *B60R 1/29* (2022.01);
(Continued)

(58) Field of Classification Search
CPC .... G06V 20/59; G06V 40/161; G06V 40/172; G06V 40/174; G06V 40/45; G06V 40/10; G06V 20/593; G06V 40/103; G06V 40/168; G06V 40/20; G06V 20/64; G06V 40/171; G06V 20/52; G06V 20/597; G06V 40/165; G06V 10/82; G06V 40/15; G06V 20/49; G06V 40/16; G06V 40/175; G06V 10/147;
(Continued)

(56) References Cited

U.S. PATENT DOCUMENTS 9,227,484 B1    1/2016  Justice et al.
10,666,901 B1 *  5/2020  Zhang .................... H04L 65/80
(Continued)

FOREIGN PATENT DOCUMENTS

WO    WO 2020/165908    8/2020

OTHER PUBLICATIONS

Extended Search Report for European Patent Application No. 22150380.8, dated May 25, 2022, 10 pages.

*Primary Examiner* — Nimesh Patel
(74) *Attorney, Agent, or Firm* — Sheridan Ross P.C.

(57) ABSTRACT

The invention provides a method and device for protecting a child inside a vehicle, a computer device, a computer-readable storage medium, and a vehicle, which are applied to the technical field of automobiles. The method for protecting a child inside a vehicle includes: receiving image data inside a vehicle; performing facial detection on the image data to detect passengers in the vehicle; further classifying the detected passengers in the vehicle into children and adults according to the facial detection; and performing a corresponding protection operation when a result of the classification indicates that there is a child alone in the vehicle.

19 Claims, 3 Drawing Sheets

(51) Int. Cl.

| | | |
|---|---|---|
| *B60R 1/29* | (2022.01) | |
| *G06V 40/10* | (2022.01) | |
| *G06V 40/40* | (2022.01) | |
| *B60H 1/00* | (2006.01) | |
| *B60R 25/01* | (2013.01) | |
| *B60R 25/102* | (2013.01) | |
| *B60R 25/30* | (2013.01) | |
| *B60R 25/31* | (2013.01) | |
| *E05B 77/12* | (2014.01) | |
| *E05B 77/54* | (2014.01) | |
| *E05B 81/56* | (2014.01) | |
| *G01S 13/08* | (2006.01) | |
| *G06F 3/14* | (2006.01) | |
| *G08B 21/02* | (2006.01) | |
| *G10L 17/06* | (2013.01) | |
| *G10L 25/63* | (2013.01) | |

(52) U.S. Cl.
CPC ............ *B60R 25/01* (2013.01); *B60R 25/102* (2013.01); *B60R 25/305* (2013.01); *B60R 25/31* (2013.01); *E05B 77/12* (2013.01); *E05B 77/54* (2013.01); *E05B 81/56* (2013.01); *G01S 13/08* (2013.01); *G06F 3/14* (2013.01); *G06V 40/103* (2022.01); *G06V 40/161* (2022.01); *G06V 40/172* (2022.01); *G06V 40/174* (2022.01); *G06V 40/45* (2022.01); *G08B 21/0205* (2013.01); *G10L 17/06* (2013.01); *G10L 25/63* (2013.01); *B60R 2300/8013* (2013.01)

(58) Field of Classification Search
CPC .... G06V 10/764; G06V 40/107; G06V 20/40; G06V 40/23; G06V 30/40; B60H 1/00742; B60R 1/29; B60R 25/01; B60R 25/102; B60R 25/305; B60R 25/31; B60R 2300/8013; B60R 16/037; B60R 1/062; B60R 2022/4816; B60R 2022/4866; B60R 21/01538; B60R 21/01546; B60R 22/48; B60R 22/105; B60R 2021/0006; B60R 2021/006; B60R 21/055; B60R 21/01534; B60R 2022/4858; B60R 21/01512; B60R 21/01556; B60R 22/347; B60R 2021/01034; B60R 1/04; B60R 11/0235; B60R 2021/0002; B60R 2021/01311; B60R 21/2072; B60R 21/207; B60R 21/01552; B60R 21/02; B60R 21/0173; B60R 21/23138; B60R 22/00; B60R 22/024; B60R 22/26; B60R 2300/10; B60R 2300/105; B60R 2300/8006; B60R 25/255; B60R 25/257; B60R 25/30; B60R 21/0155; B60R 21/01566; B60R 21/01548; B60R 21/015; B60R 16/023; E05B 77/12; E05B 81/64; E05B 77/48; E05B 77/26; E05B 77/24; E05B 81/90; E05B 77/28; E05B 77/54; E05B 81/00; E05B 81/56; E05B 83/26; G08B 21/22; G10L 17/00; G06N 3/045; G06N 3/08; G06N 20/00; G06N 5/048; G06N 5/04; G06N 5/045; G06T 2207/30196; G06T 2210/16; G06T 19/20; G06T 7/0012; G06T 7/70; G06T 7/20; G06T 2207/10016; G06T 2207/10048; G06T 2207/10116; G06T 2207/20084; G06T 15/00; G06T 17/00; G06T 1/0007; G06T 2207/20081; G06T 7/60; G06T 7/246; B60N 2/2821; B60N 2/2812; B60N 2/26; B60N 2/265; B60N 2/427; B60N 2/2863; B60N 2/3081; B60N 2/4221; B60N 2/289; B60N 2/01; B60N 2/146; B60N 2/2842; B60N 2/42781; B60N 2/4279; B60N 2002/981; B60N 2/002; B60N 2/242; B60N 2/2803; B60N 2/28; B60N 2/2851
See application file for complete search history.

(56) References Cited

U.S. PATENT DOCUMENTS

| | | | |
|---|---|---|---|
| 11,193,312 B1* | 12/2021 | Weng | G06V 20/59 |
| 2011/0295466 A1* | 12/2011 | Ostu | B60R 21/01534 374/45 |
| 2015/0379362 A1* | 12/2015 | Calmes | G06T 7/20 348/136 |
| 2020/0285842 A1* | 9/2020 | Wang | G06F 18/214 |
| 2020/0285870 A1* | 9/2020 | Yi | B60W 50/14 |
| 2021/0300274 A1* | 9/2021 | Manawadu | B60R 21/01538 |
| 2021/0334564 A1* | 10/2021 | Park | G06F 18/24 |
| 2022/0084386 A1* | 3/2022 | Lopez | G08B 19/00 |

\* cited by examiner

METHOD AND DEVICE FOR PROTECTING CHILD INSIDE VEHICLE, COMPUTER DEVICE, COMPUTER-READABLE STORAGE MEDIUM, AND VEHICLE

CROSS-REFERENCE TO RELATED APPLICATION

This application claims the benefit of Chinese Patent Application No. 202110024705.7 filed Jan. 8, 2021, the entire contents of which are incorporated herein by reference in its entirety.

TECHNICAL FIELD

The invention relates to the technical field of automobiles, and in particular to a method and device for protecting a child inside a vehicle, a computer device, a computer-readable storage medium, and a vehicle.

BACKGROUND ART

Children, as a special group of vehicle occupants, have limited behavioral and cognitive abilities.

Tragedies caused by children being left in vehicles are commonly reported. A meteorological service report issued by a company of American shows that more than 800 children in the United States have died of heatstroke in vehicles since records began in 1998. Another organization concerned with child safety also released similar data. In the United States, an average of almost 38 children died of being trapped inside vehicles each year. This number of deaths reached its peak in 2018, up to 52.

A traditional child lock can often protect a child occupant only when it is actively activated by others (for example, parents). Once parents fail to activate the child lock in time, the child may open a vehicle door and suffer from an accident as a result of being unable to distinguish a possible danger.

In addition, since a child often sits in the rear seat of a vehicle, a driver cannot easily observe the state of the child. Furthermore, the driver cannot pay attention to the child during the driving of the vehicle.

Therefore, there is a need for a vehicle control technique that can better provide protection and caring for children.

SUMMARY OF THE INVENTION

In order to solve or at least alleviate one or more of the above problems, the following technical solutions are provided.

According to an aspect of the invention, a method for protecting a child inside a vehicle is provided. The method includes: receiving image data inside a vehicle; performing facial detection on the image data to detect passengers in the vehicle; further classifying the detected passengers in the vehicle into children and adults according to the facial detection; and performing a corresponding protection operation when a result of the classification indicates that there is a child alone in the vehicle.

In the method for protecting a child inside a vehicle according to an embodiment of the invention, the corresponding protection operation includes: sending an early warning message to a vehicle owner, enabling an in-vehicle screen viewing function in a smart terminal of the vehicle owner, and/or maintaining the temperature in the vehicle at a comfortable sensible temperature.

The method for protecting a child inside a vehicle according to an embodiment of the invention further includes: receiving voiceprint data inside the vehicle; and performing voiceprint detection on the voiceprint data, where the operation of classification is also based on the voiceprint detection.

The method for protecting a child inside a vehicle according to an embodiment of the invention further includes: receiving distance data from an in-vehicle radar; and performing living body detection on the distance data, where a non-living body is removed from the detected passengers in the vehicle according to the living body detection, and then, the operation of classification is performed.

The method for protecting a child inside a vehicle according to an embodiment of the invention further includes: performing torso detection on the image data, where the operation of classification is also based on the torso detection, and where the torso detection includes detecting a shoulder posture and/or width.

The method for protecting a child inside a vehicle according to an embodiment of the invention further includes performing the following protection operation when the result of the classification indicates that there is a child in the vehicle: activating a child lock upon receiving a signal indicating that a vehicle is coming from behind; and/or activating the child lock during driving.

The method for protecting a child inside a vehicle according to an embodiment of the invention further includes: playing a nursery rhyme when the result of the classification indicates that there is a child in the vehicle, the facial detection indicates that the child shows a negative emotion, and the voiceprint detection indicates that the child is crying.

The method for protecting a child inside a vehicle according to an embodiment of the invention further includes performing the following protection operation when a signal indicating that the vehicle is started is received, and the image data indicates that the starting is performed by the child in the vehicle: prohibiting the vehicle from entering a driving state until an authorization is obtained from the vehicle owner; sending an early warning message to the vehicle owner; and/or enabling the in-vehicle screen viewing function in the smart terminal of the vehicle owner.

The method for protecting a child inside a vehicle according to an embodiment of the invention further includes displaying, when the vehicle is driving and the result of the classification indicates that there is a child in the vehicle, image data representative of the child in the vehicle on a display screen in the vehicle.

According to a further aspect of the invention, a computer device is provided. The computer device includes a processor and a memory. When a computer program stored on the memory is run on the processor, any one of the methods for protecting a child inside a vehicle above is implemented.

According to another aspect of the invention, a computer-readable storage medium is provided. The computer-readable storage medium has a computer program stored thereon. When the computer program is run on a processor, any one of the methods for protecting a child inside a vehicle above is implemented.

According to still another aspect of the invention, an device for protecting a child inside a vehicle is provided. The device includes: a first receiving unit configured to receive image data inside a vehicle; a first detection unit configured to perform facial detection on the image data to detect passengers in the vehicle; a classification unit configured to further classify the detected passengers in the vehicle into children and adults according to the facial detection; and a protection unit configured to perform a corresponding protection operation when a result of the classification indicates that there is a child alone in the vehicle.

In the device for protecting a child inside a vehicle according to an embodiment of the invention, the corresponding protection operation includes: sending an early warning message to a vehicle owner, enabling an in-vehicle screen viewing function in a smart terminal of the vehicle owner, and/or maintaining the temperature in the vehicle at a comfortable sensible temperature.

The device for protecting a child inside a vehicle according to an embodiment of the invention further includes: a second receiving unit configured to receive voiceprint data inside the vehicle; and a second detection unit configured to perform voiceprint detection on the voiceprint data, where the operation of classification is also based on the voiceprint detection.

The device for protecting a child inside a vehicle according to an embodiment of the invention further includes: a third receiving unit configured to receive distance data from an in-vehicle radar; and a third detection unit configured to perform living body detection on the distance data, where the classification unit is further configured to remove a non-living body from the detected passengers in the vehicle according to the living body detection, and then perform the operation of classification.

The device for protecting a child inside a vehicle according to an embodiment of the invention further includes a fourth detection unit configured to perform torso detection on the image data, where the operation of classification is also based on the torso detection, and where the torso detection includes detecting a shoulder posture and/or width.

In the device for protecting a child inside a vehicle according to an embodiment of the invention, the protection unit is further configured to perform the following protection operation when the result of the classification indicates that there is a child in the vehicle: activating a child lock upon receiving a signal indicating that a vehicle is coming from behind; and/or activating the child lock during driving.

In the device for protecting a child inside a vehicle according to an embodiment of the invention, the protection unit is further configured to output a signal indicating to play a nursery rhyme when the result of the classification indicates that there is a child in the vehicle, the facial detection indicates that the child shows a negative emotion, and the voiceprint detection indicates that the child is crying.

In the device for protecting a child inside a vehicle according to an embodiment of the invention, the protection unit is further configured to perform the following protection operation when a signal indicating that the vehicle is started is received, and the image data indicates that the starting is performed by the child in the vehicle: prohibiting the vehicle from entering a driving state until an authorization is obtained from the vehicle owner; sending an early warning message to the vehicle owner; and/or enabling the in-vehicle screen viewing function in the smart terminal of the vehicle owner.

In the device for protecting a child inside a vehicle according to an embodiment of the invention, the protection unit is further configured to display, when the vehicle is driving and the result of the classification indicates that there is a child in the vehicle, image data representative of the child in the vehicle on a display screen in the vehicle.

According to yet still another aspect of the invention, a vehicle is provided, which includes any one of the devices for protecting a child inside a vehicle above.

BRIEF DESCRIPTION OF THE DRAWINGS

The above and other objectives and advantages of the invention will be clearer and more thorough from the following detailed description in conjunction with the drawings.

DETAILED DESCRIPTION OF EMBODIMENTS

It should be understood that the term "vehicle" or other similar terms used herein includes general motor vehicles, such as passenger vehicles (including sport utility vehicles, buses, trucks, etc.), various commercial vehicles, ships, aircrafts, etc., and includes hybrid vehicles, electric vehicles, plug-in hybrid electric vehicles, etc. A hybrid vehicle is a vehicle with two or more power sources, such as a vehicle powered by a gasoline engine and an electric motor.

It should also be noted that the terms such as "first", "second", "third" and "fourth" in the description and the claims of the present invention are used to distinguish similar objects, and do not necessarily describe a specific order of precedence. In addition, the terms "comprise", "include" and similar expressions are intended to indicate non-exclusive inclusions, unless otherwise specifically stated.

Various exemplary embodiments according to the invention will be described below in detail with reference to the drawings.

Figure 1:
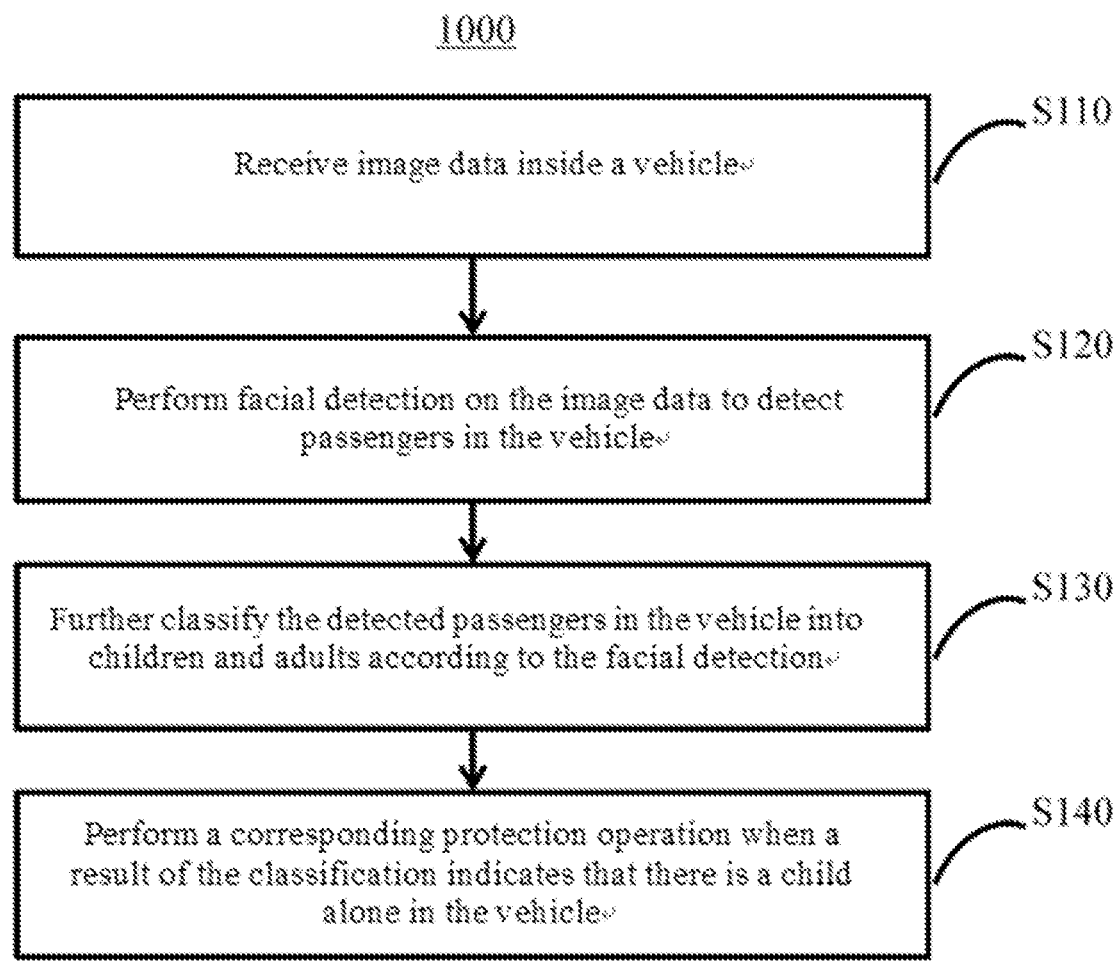
FIG. 1 shows a flowchart of a method 1000 for protecting a child inside a vehicle according to an embodiment of the invention.

FIG. 1 shows a flowchart of a method 1000 for protecting a child inside a vehicle according to an embodiment of the invention. In step S110, image data inside a vehicle is received. Optionally, these pieces of image data are received from an in-vehicle image sensor.

In step S120, facial detection is performed on the received image data to detect passengers in the vehicle. Optionally, the facial detection is performed on a single frame of image data using a processor, such as a system-on-chip, a micro processing unit, or a domain controller. Optionally, the facial detection can be performed by means of a single-stage deep learning object detection network, such as a multi-task convolutional neural network (MTCNN) and a CenterNet.

In step S130, the detected passengers in the vehicle are further classified into children and adults according to the facial detection. Optionally, a deep learning network can be used to classify the detected facial image region into children (for example, 0-12 years old) and adults (for example, 18 years old and above). For a network design, reference may be made to, for example, an ordinal regression with multiple output CNN for Age Estimation. Children can be further subdivided into infants (0-4 years old, needing a safety seat) and average children (4-12 years old).

In step S140, a corresponding protection operation is performed when a result of the classification indicates that there is a child alone in the vehicle (that is, in a scenario where a child is left in the vehicle). The protection operation described here is an operation, such as an environmental control operation or an early warning operation, for avoiding or at least mitigating the problem that the child is put in danger as a result of being left in the vehicle. The protection operation may include sending an early warning message to a vehicle owner. The protection operation may also include enabling an in-vehicle screen viewing function in a smart terminal of the vehicle owner, which allows a real-time screen of the child in the vehicle to be transmitted to the smart terminal of the vehicle owner, so that the vehicle owner can observe, in real time, the state of the child being left. The protection operation may also include maintaining the temperature in the vehicle at a comfortable sensible temperature (for example, 24° C.-26° C.), to prevent the child from suffering from an accident, such as sunstroke and frostbite, as a result of being left in the vehicle. The smart terminal is, for example, an electronic device such as a mobile phone and a tablet computer.

The method for protecting a child inside a vehicle according to an embodiment of the invention further includes receiving voiceprint data inside the vehicle, and performing voiceprint detection on the received voiceprint data. The operation of classification can also be based on a result of the voiceprint detection. For example, upon detecting, through voiceprint detection, that there is only child voiceprint data but no adult voiceprint data, it is determined that the vehicle is in the scenario where a child is left in the vehicle. The voiceprint detection and the foregoing facial detection can be combined and applied to the determination of an in-vehicle scenario.

The method for protecting a child inside a vehicle according to an embodiment of the invention further includes: receiving distance data from an in-vehicle radar, and performing living body detection on the distance data. The living body detection can filter out false facial detection. If a passenger detected by an image sensor is identified as a non-living body by the living body detection, data indicating the detected passenger is removed from passenger data to be subsequently classified. The in-vehicle radar is, for example, a millimeter-wave radar mounted at the rear of the vehicle.

The method for protecting a child inside a vehicle according to an embodiment of the invention further includes performing torso detection on the received image data. The operation of classification of children and adults can also be based on, for example, a shoulder posture and width in the torso detection, so as to filter out facial detection-based misclassifications, and correct a facial detection-based classification result. For example, when the torso is facing towards a camera, a passenger with a shoulder width less than 26 cm is generally considered to be a child, more particularly an infant under Children; and a passenger with a shoulder width greater than 34 cm is generally considered to be an adult. If a passenger is classified as a child (for example, an infant under Children) based on the facial detection, whereas it is determined through the torso detection that the passenger has a shoulder width of greater than 34 cm when facing towards the camera, the facial detection-based classification result is considered to be wrong, and should be corrected based on the torso detection.

The method for protecting a child inside a vehicle according to an embodiment of the invention further includes performing a protection operation when the result of the classification indicates that there is a child in the vehicle (that is, in a scenario where a child is protected against opening the door). The protection operation may include activating a child lock upon receiving a signal indicating that a vehicle is coming from behind. When the child lock is activated, the vehicle door cannot be opened directly by a switch on the door. The signal indicating that a vehicle is coming from behind may come from a vehicle control center, or directly from a vehicle rear view sensor, such as a millimeter-wave radar, a laser radar, or an image sensor. This can protect the child from opening the vehicle door and getting out of the vehicle without seeing a vehicle coming from behind, and thus putting the child in danger. The protection operation may also include activating the child lock during driving. This can prevent the child from opening the door accidentally during the driving of the vehicle, and thus putting the child in danger.

Optionally, in the scenario where a child is protected against opening the door, if it is determined through the facial detection that there is a child in the vehicle and the child sits in a rear seat, a child lock for the rear seat can be activated. External and internal parameters of the camera may be used to convert the child from image coordinates to xy coordinates in a vehicle space coordinate system (where the x coordinate system is in a traveling direction of the vehicle, and the y coordinate system is on both sides, in a width direction, of the vehicle). An empirical value of the head size of the child and the size of the face imaged on the screen are used to determine whether the child sits in the rear seat. The millimeter-wave radar or a seat sensor mounted in the vehicle may also be used to determine whether the child sits in the rear seat. That is, z (depth) coordinates of the child in the vehicle space coordinate system are obtained from depth coordinates of front and rear seats.

Figure 3:
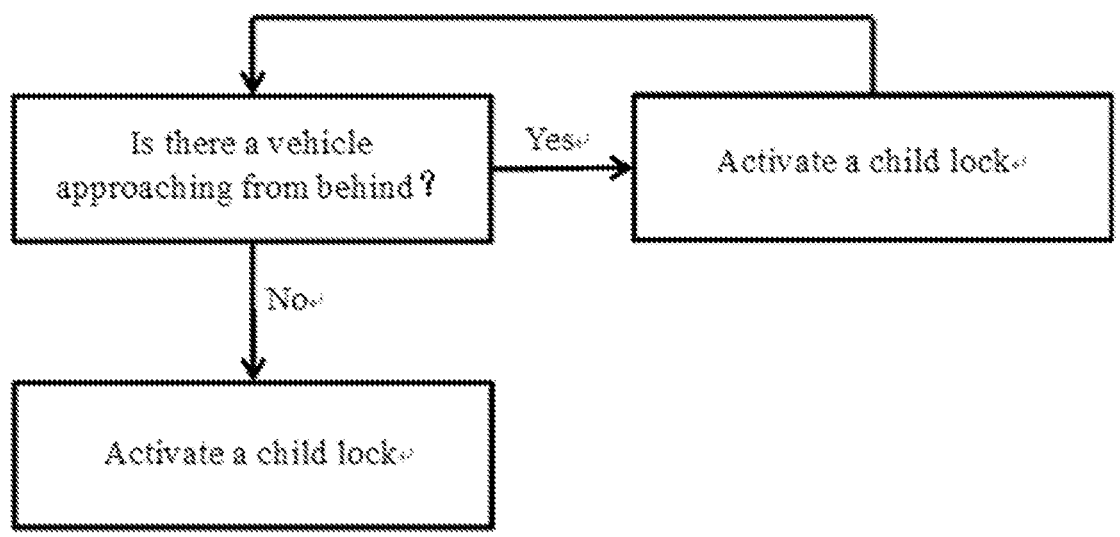
FIG. 3 shows a method for determining activation/deactivation of a child lock in a vehicle according to an embodiment of the invention.

In the scenario where a child is protected against opening the door, the state of the child lock can be adjusted in real time depending on whether there is a vehicle coming from behind. As shown in FIG. 3, data from a vehicle rear view sensor is used to determine, in real time, whether there is a vehicle approaching from behind. If there is a vehicle approaching from behind, the child lock is activated, and it is continuously monitored whether there is a vehicle coming from behind. If there is no vehicle approaching from behind, the child lock is deactivated.

The method for protecting a child inside a vehicle according to an embodiment of the invention further includes: when the result of the classification indicates that there is a child in the vehicle, the facial detection indicates that the child shows a negative emotion, and the voiceprint detection indicates that the child in the vehicle is crying (that is, in a scenario where the child is crying), automatically playing a nursery rhyme to keep the child in the vehicle stable emotionally. The nursery rhyme may be a nursery rhyme stored in local storage, or a nursery rhyme downloaded from cloud storage.

The method for protecting a child inside a vehicle according to an embodiment of the invention further includes performing a protection operation when a signal indicating that the vehicle is started is received, and the image data indicates that the starting of the vehicle is performed by the child in the vehicle (that is, in a scenario where the child is starting the vehicle). The protection operation may include prohibiting the vehicle from entering a driving state. The protection operation may also include sending an early warning message to a vehicle owner. The early warning message may be sent to the vehicle owner by means of a short message, a mobile phone application, etc. The protection operation may also include enabling an in-vehicle screen viewing function in a smart terminal of the vehicle owner. The prohibition of the vehicle entering the driving state can be released after an authorization is obtained from the vehicle owner.

The method for protecting a child inside a vehicle according to an embodiment of the invention further includes displaying, when the vehicle is driving and the result of the classification indicates that there is a child in the vehicle (that is, in a scenario where a child is paid attention to), image data representative of the children in the vehicle on a display screen in the vehicle, for example, on a center console screen in the vehicle. This may allow a user in the front seat to view the state of the child in the vehicle without turning his/her head, generally speaking, the state of the child in the rear seat. The user in the front seat may also freely zoom in and out the size of the screen. Using the image data, the voiceprint data, etc., in combination with the behavior and emotional state of the child, two modes can be intelligently switched, i.e. displaying of a child face or displaying of a child whole body, which is applicable to more scenarios for attention.

Figure 2:
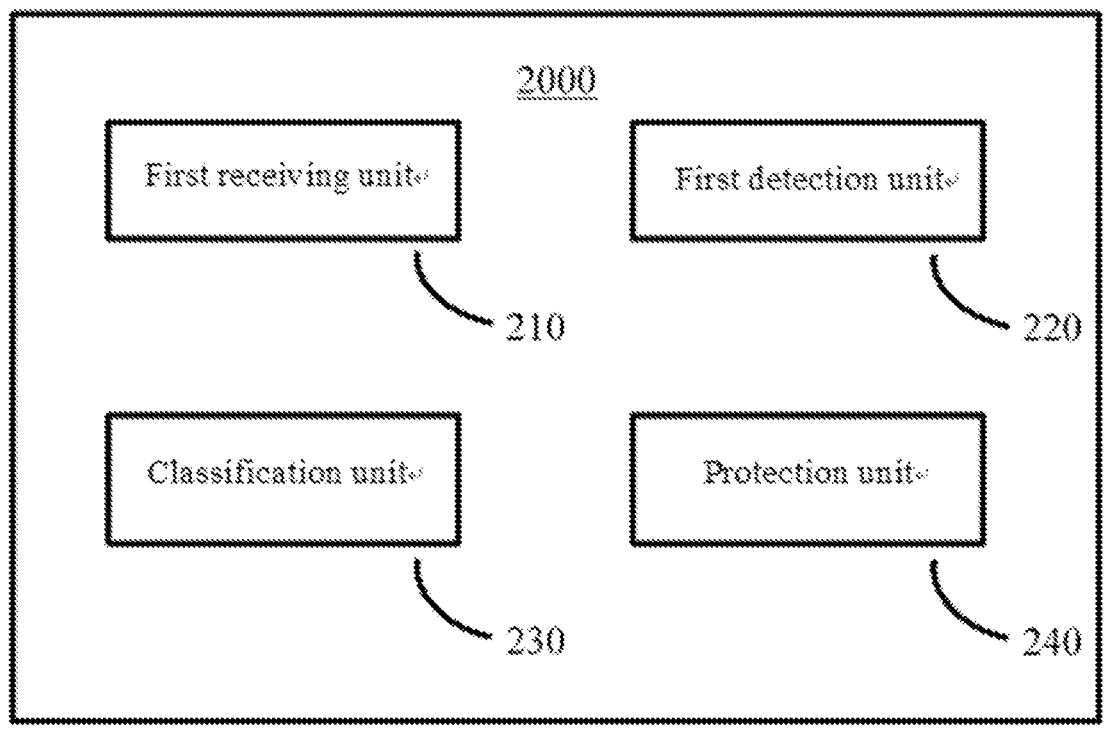
FIG. 2 shows a block diagram of a device 2000 for protecting a child inside a vehicle according to an embodiment of the invention.

FIG. 2 shows a block diagram of a device 2000 for protecting a child inside a vehicle according to an embodiment of the invention. The device 2000 for protecting a child inside a vehicle includes a first receiving unit 210, a first detection unit 220, a classification unit 230, and a protection unit 240.

The first receiving unit 210 is configured to receive image data inside a vehicle. Optionally, these pieces of image data are received from an in-vehicle image sensor.

The first detection unit 220 is configured to perform facial detection on the received image data to detect passengers in the vehicle. Optionally, the facial detection is performed on a single frame of image data using a processor, such as a system-on-chip, a micro processing unit, or a domain controller. Optionally, the facial detection can be performed by means of a single-stage deep learning object detection network, such as a multi-task convolutional neural network (MTCNN) and a CenterNet.

The classification unit 230 is configured to further classify the detected passengers in the vehicle into children and adults according to the facial detection. Optionally, a deep learning network can be used to classify the detected facial image region into children (for example, 0-12 years old) and adults (for example, 18 years old and above). For a network design, reference may be made to, for example, an ordinal regression with multiple output CNN for Age Estimation. Children can be further subdivided into infants (0-4 years old, needing a safety seat) and average children (4-12 years old).

The protection unit 240 is configured to perform a corresponding protection operation when a result of the classification indicates that there is a child alone in the vehicle (that is, in a scenario where a child is left in the vehicle). The protection operation described here is an operation, such as an environmental control operation or an early warning operation, for avoiding or at least mitigating the problem that the child is put in danger as a result of being left in the vehicle. The protection operation may include sending an early warning message to a vehicle owner. In the context of the invention, the "vehicle owner" may be an early warning contact pre-saved in a vehicle system, or any relevant person who has contact information stored in a vehicle memory (local storage or cloud storage). The protection operation may also include enabling an in-vehicle screen viewing function in a smart terminal of the vehicle owner, which allows a real-time screen of the child in the vehicle to be transmitted to the smart terminal of the vehicle owner, so that the vehicle owner can observe, in real time, the state of the child being left. The protection operation may also include maintaining the temperature in the vehicle at a comfortable sensible temperature (for example, 24° C.-26° C.), to prevent the child from suffering from an accident, such as sunstroke and frostbite, as a result of being left in the vehicle. The smart terminal is, for example, an electronic device such as a mobile phone and a tablet computer.

The device for protecting a child inside a vehicle according to an embodiment of the invention further includes a second receiving unit and a second detection unit. The second receiving unit is configured to receive voiceprint data inside the vehicle. The second detection unit is configured to perform voiceprint detection on the second voiceprint data. The operation of classification can also be based on a result of the voiceprint detection. For example, upon detecting, through voiceprint detection, that there is only child voiceprint data but no adult voiceprint data, it is determined that the vehicle is in the scenario where a child is left in the vehicle. The voiceprint detection and the foregoing facial detection can be combined and applied to the determination of an in-vehicle scenario.

The device for protecting a child inside a vehicle according to an embodiment of the invention further includes a third receiving unit and a third detection unit. The third receiving unit is configured to receive distance data from an in-vehicle radar. The third detection unit is configured to perform living body detection on the distance data. The living body detection can filter out false facial detection. If a passenger detected by an image sensor is identified as a non-living body by the living body detection, data indicating the detected passenger is removed from passenger data to be subsequently classified. The in-vehicle radar is, for example, a millimeter-wave radar mounted at the rear of the vehicle.

The device for protecting a child inside a vehicle according to an embodiment of the invention further includes a fourth detection unit. The fourth detection unit is configured to perform torso detection on the received image data. The operation of classification of children and adults can also be based on, for example, a shoulder posture and width in the torso detection, so as to filter out facial detection-based misclassifications, and correct a facial detection-based classification result. For example, when the torso is facing towards a camera, a passenger with a shoulder width less than 26 cm is generally considered to be a child, more particularly an infant under Children; and a passenger with a shoulder width greater than 34 cm is generally considered to be an adult. If a passenger is classified as a child (for example, an infant under Children) based on the facial detection, whereas it is determined through the torso detection that the passenger has a shoulder width of greater than 34 cm when facing towards the camera, the facial detection-based classification result is considered to be wrong, and should be corrected based on the torso detection.

In the device for protecting a child inside a vehicle according to an embodiment of the invention, the protection unit 240 is further configured to perform a protection operation when the result of the classification indicates that there is a child in the vehicle (that is, in a scenario where a child is protected against opening the door). The protection operation may include activating a child lock upon receiving a signal indicating that a vehicle is coming from behind. When the child lock is activated, the vehicle door cannot be opened directly by a switch on the door. The signal indicating that a vehicle is coming from behind may come from a vehicle control center, or directly from a vehicle rear view sensor, such as a millimeter-wave radar, an image sensor, or a laser radar. This can protect the child from opening the vehicle door and getting out of the vehicle without seeing a vehicle coming from behind, and thus putting the child in danger. The protection operation may also include activating the child lock during driving. This can prevent the child from opening the door accidentally during the driving of the vehicle, and thus putting the child in danger.

Optionally, in the scenario where a child is protected against opening the door, if it is determined through the facial detection that there is a child in the vehicle and the child sits in a rear seat, a child lock for the rear seat can be activated. External and internal parameters of the camera may be used to convert the child from image coordinates to xy coordinates in a vehicle space coordinate system (where the x coordinate system is in a traveling direction of the vehicle, and the y coordinate system is on both sides, in a width direction, of the vehicle). An empirical value of the head size of the child and the size of the face imaged on the screen are used to determine whether the child sits in the rear seat. The millimeter-wave radar or a seat sensor mounted in the vehicle may also be used to determine whether the child sits in the rear seat. That is, z (depth) coordinates of the child in the vehicle space coordinate system are obtained from depth coordinates of front and rear seats.

In the scenario where a child is protected against opening the door, the state of the child lock can be adjusted in real time depending on whether there is a vehicle coming from behind. As shown in FIG. 3, data from a vehicle rear view sensor is used to determine, in real time, whether there is a vehicle approaching from behind. If there is a vehicle approaching from behind, the child lock is activated, and it is continuously monitored whether there is a vehicle coming from behind. If there is no vehicle approaching from behind, the child lock is deactivated.

In the device for protecting a child inside a vehicle according to an embodiment of the invention, the protection unit 240 is further configured to: when the result of the classification indicates that there is a child in the vehicle, the facial detection indicates that the child shows a negative emotion, and the voiceprint detection indicates that the child in the vehicle is crying (that is, in a scenario where the child is crying), automatically play a nursery rhyme to keep the child in the vehicle stable emotionally. The nursery rhyme may be a nursery rhyme stored in local storage, or a nursery rhyme downloaded from cloud storage.

In the device for protecting a child inside a vehicle according to an embodiment of the invention, the protection unit 240 is further configured to perform a protection operation when a signal indicating that the vehicle is started is received, and the image data indicates that the starting of the vehicle is performed by the child in the vehicle (that is, in a scenario where the child is starting the vehicle). The protection operation may include prohibiting the vehicle from entering a driving state. The protection operation may also include sending an early warning message to a vehicle owner. The early warning message may be sent to the vehicle owner by means of a short message, a mobile phone application, etc. The protection operation may also include enabling an in-vehicle screen viewing function in a smart terminal of the vehicle owner. The prohibition of the vehicle entering the driving state can be released after an authorization is obtained from the vehicle owner.

In the device for protecting a child inside a vehicle according to an embodiment of the invention, the protection unit 240 is further configured to display, when the vehicle is driving and the result of the classification indicates that there is a child in the vehicle (that is, in a scenario where a child is paid attention to), image data representative of the children in the vehicle on a display screen in the vehicle, for example, on a center console screen in the vehicle. This may allow a user in the front seat to view the state of the child in the vehicle without turning his/her head, generally speaking, the state of the child in the rear seat. The user in the front seat may also freely zoom in and out the size of the screen. Using the image data, the voiceprint data, etc., in combination with the behavior and emotional state of the child, two modes can be intelligently switched, i.e. displaying of a child face or displaying of a child whole body, which is applicable to more scenarios for attention.

In conclusion, by means of the technique for protecting a child inside a vehicle provided in the invention, the received sensor data is used to perform detection associated with the child, and then, different protection and caring operations are provided in different scenarios related to the child in the vehicle according to detection results. This greatly improves the safety and experience of children in a vehicle.

Some block diagrams shown in FIG. 2 are functional entities and do not necessarily correspond to physically or logically independent entities. These functional entities may be implemented in the form of software, in one or more hardware modules or integrated circuits, or in different networks and/or processor apparatuses and/or micro-controller apparatuses.

It should be understood that the method for protecting a child inside a vehicle according to the foregoing embodiments of the invention can be implemented as a computer program product. Therefore, the invention may, for example, take the form of a computer program product implemented on one or more computer-available storage media (including but not limited to a magnetic disk memory, an optical memory, etc.) containing computer-available program code therein.

It should also be understood that the device for protecting a child inside a vehicle according to the foregoing embodiments of the invention can be incorporated into a vehicle.

It should also be understood that in some alternative embodiments, the functions/steps included in the method may not occur in the order shown in the flowchart. For example, two functions/steps shown in sequence may be executed substantially simultaneously or even in a reverse order. This specifically depends on the functions/steps involved.

Although only some implementations of the invention are described above, a person of ordinary skill in the art should understand that the invention may be implemented in multiple other forms without departing from the essence and scope of the invention. Accordingly, the presented examples and implementations are considered to be illustrative rather than restrictive, and the invention may encompass various modifications and replacements without departing from the spirit and scope of the invention that are defined by the appended claims.

What is claimed is:

1. A method for protecting a child inside a vehicle, comprising:
   receiving image data representing an inside of a vehicle;
   performing facial detection on the image data to detect passengers in the vehicle;
   classifying the detected passengers in the vehicle into children and adults according to the facial detection; and
   performing a corresponding protection operation when a result of the classification indicates that there is a child alone in the vehicle, wherein the corresponding protection operation comprises activating a child lock upon receiving a signal indicating that another vehicle is coming from behind.

2. The method for protecting a child inside a vehicle according to claim 1, wherein the corresponding protection operation comprises:
sending an early warning message to a vehicle owner;
enabling an in-vehicle screen viewing function in a smart terminal of the vehicle owner; and/or
maintaining the temperature in the vehicle at a comfortable sensible temperature.

3. The method for protecting a child inside a vehicle according to claim 1, further comprising:
receiving voiceprint data from inside the vehicle; and
performing voiceprint detection on the voiceprint data,
wherein the operation of classification is also based on the voiceprint detection.

4. The method for protecting a child inside a vehicle according to claim 3, further comprising:
playing a nursery rhyme when the result of the classification indicates that there is a child in the vehicle, the facial detection indicates that the child shows a negative emotion, and the voiceprint detection indicates that the child is crying.

5. The method for protecting a child inside a vehicle according to claim 1, further comprising:
receiving distance data from an in-vehicle radar; and
performing living body detection on the distance data,
wherein a non-living body is removed from the detected passengers in the vehicle according to the living body detection, and then, the operation of classification is performed.

6. The method for protecting a child inside a vehicle according to claim 1, further comprising:
performing torso detection on the image data,
wherein the operation of classification is also based on the torso detection, and
wherein the torso detection comprises detecting a shoulder posture and/or width.

7. The method for protecting a child inside a vehicle according to claim 1, further comprising:
performing the following corresponding protection operation when the result of the classification indicates that there is a child in the vehicle:
activating the child lock during driving.

8. The method for protecting a child inside a vehicle according to claim 1, further comprising:
performing the following corresponding protection operation when a signal indicating that the vehicle is started is received, and the image data indicates that the starting is performed by the child in the vehicle:
prohibiting the vehicle from entering a driving state until an authorization is obtained from the vehicle owner;
sending an early warning message to the vehicle owner; and/or
enabling the in-vehicle screen viewing function in a smart terminal of the vehicle owner.

9. The method for protecting a child inside a vehicle according to claim 1, further comprising:
displaying, when the vehicle is driving and the result of the classification indicates that there is a child in the vehicle, image data representative of the child in the vehicle on a display screen in the vehicle.

10. A computer device, comprising:
a processor and a memory, wherein when a computer program stored on the memory is run on the processor, the processor executes a method for protecting a child inside a vehicle, the method comprising:
receiving image data representing an inside of a vehicle;
performing facial detection on the image data to detect passengers in the vehicle;
classifying the detected passengers in the vehicle into children and adults according to the facial detection; and
performing a corresponding protection operation when a result of the classification indicates that there is a child alone in the vehicle, wherein the corresponding protection operation comprises activating a child lock upon receiving a signal indicating that another vehicle is coming from behind.

11. A device for protecting a child inside a vehicle, comprising:
a processor and a memory, wherein when a computer program stored on the memory is run on the processor, the processor executes a method for protecting a child inside a vehicle, the method comprising:
receiving image data representing an inside of a vehicle;
performing facial detection on the image data to detect passengers in the vehicle;
classifying the detected passengers in the vehicle into children and adults according to the facial detection; and
performing a corresponding protection operation when a result of the classification indicates that there is a child alone in the vehicle, wherein the corresponding protection operation comprises activating a child lock upon receiving a signal indicating that another vehicle is coming from behind, and deactivating the child lock upon receiving a signal that there is not another vehicle coming from behind.

12. The device for protecting a child inside a vehicle according to claim 11, wherein the corresponding protection operation comprises:
sending an early warning message to a vehicle owner,
enabling an in-vehicle screen viewing function in a smart terminal of the vehicle owner, and/or
maintaining the temperature in the vehicle at a comfortable sensible temperature.

13. The device for protecting a child inside a vehicle according to claim 11, wherein the method executed by the processor further comprises:
receiving voiceprint data from inside the vehicle; and
performing voiceprint detection on the voiceprint data,
wherein the operation of classification is also based on the voiceprint detection.

14. The device for protecting a child inside a vehicle according to claim 13, wherein the method executed by the processor further comprises:
outputting a signal indicating to play a nursery rhyme when the result of the classification indicates that there is a child in the vehicle, the facial detection indicates that the child shows a negative emotion, and the voiceprint detection indicates that the child is crying.

15. The device for protecting a child inside a vehicle according to claim 11, wherein the method executed by the processor further comprises:
receiving distance data from an in-vehicle radar;
performing living body detection on the distance data; and
removing, before classifying the detected passengers, a non-living body from the detected passengers in the vehicle according to the living body detection.

16. The device for protecting a child inside a vehicle according to claim 11, wherein the method executed by the processor further comprises:

performing torso detection on the image data,
wherein the operation of classification is also based on the torso detection, and
wherein the torso detection comprises detecting a shoulder posture and/or width.

17. The device for protecting a child inside a vehicle according to claim 11, wherein the following corresponding protection operation is performed when the result of the classification indicates that there is a child in the vehicle:
activating the child lock during driving.

18. The device for protecting a child inside a vehicle according to claim 11, wherein the following corresponding protection operation is performed when a signal indicating that the vehicle is started is received, and the image data indicates that the starting is performed by the child in the vehicle:
prohibiting the vehicle from entering a driving state until an authorization is obtained from the vehicle owner;
sending an early warning message to the vehicle owner; and/or
enabling the in-vehicle screen viewing function in a smart terminal of the vehicle owner.

19. The device for protecting a child inside a vehicle according to claim 11, wherein the method executed by the processor further comprises:
displaying, when the vehicle is driving and the result of the classification indicates that there is a child in the vehicle, image data representative of the child in the vehicle on a display screen in the vehicle.

* * * * *